United States Patent [19]

Erb

[11] 4,140,908
[45] Feb. 20, 1979

[54] DIGITAL POINT LEVEL SWITCH METHOD AND APPARATUS

[75] Inventor: Tom L. Erb, Austin, Tex.

[73] Assignee: Ramsey Engineering Company, St. Paul, Minn.

[21] Appl. No.: 821,882

[22] Filed: Aug. 4, 1977

[51] Int. Cl.² .............................................. G01F 23/00
[52] U.S. Cl. ....................................................... 250/357
[58] Field of Search ......................................... 250/357

[56] References Cited

U.S. PATENT DOCUMENTS

| 3,818,232 | 6/1974 | Kirkpatrick | 250/357 |
| 4,015,128 | 3/1977 | Della Vedova | 250/357 X |

Primary Examiner—Davis L. Willis
Attorney, Agent, or Firm—William C. Norvell, Jr.

[57] ABSTRACT

In a switching circuit for controlling the level of material in a container, a first counter accumulates pulses generated at a rate inversely related to the level of the material up to a first predetermined total. A second counter accumulates clock pulses up to a second predetermined total representing a fixed counting interval. The counters are connected in a race circuit wherein the one to reach its predetermined total first resets both counters and controls the race circuitry. The first counter sets a control circuit to indicate a low level condition or to activate an alarm, and the second counter resets the control circuit to indicate a high level condition. After the control circuit has been set by the first counter, the race circuit is responsive to a third predetermined total of the first counter, less than the first predetermined total, representing, for example, a level to which a container is to be filled. The first and third predetermined totals provide a hysteresis effect to prevent the switching circuit from "hunting" around the level at which material is to be added or an alarm condition shown.

18 Claims, 3 Drawing Figures

DIGITAL POINT LEVEL SWITCH METHOD AND APPARATUS

BACKGROUND OF THE INVENTION

1. Field of the Invention

The present invention relates in general to apparatus for determining the level of material in a container and in particular to a digital point level switch for use with a gamma ray level detection device.

2. Description of the Prior Art

During many manufacturing processes, it is important to know the level of the material in a process vessel. In some cases, a nuclear device is utilized to detect these levels, the device including a gamma ray source and a geiger tube positioned with respect to one another and the vessel such that less gamma rays are received by the geiger tube when the material in the container rises above the level of the source detection line. The geiger tube responds to the gamma rays by generating output pulses.

The conventional prior art point level switch is an analog device which includes an amplifier for amplifying the geiger tube output pulses, a rate circuit for converting the pulses per unit of time into a voltage having a magnitude proportional to the pulse count rate, a trigger circuit for comparing the rate circuit voltage with a reference voltage level to detect the level at which material is to be added to the container and a relay driver and relay for activating an alarm or an apparatus for adding and/or removing the material. In general, these devices must be simple, rugged and inexpensive. In order to operate at minimum possible radiation levels, it is necessary to employ circuitry which is accurate and reliable in an industrial environment. In an analog device, such circuitry tends to be expensive. For example, cost considerations limit the use of precision dial potentiometers for setting the trigger level or levels for the circuit when it is manufactured. Therefore, the device often must be adjusted in the field with the power on under operating conditions. However, under hazardous operating conditions, it may not be possible to make the necessary adjustments. In these cases, the circuitry can be positioned in a location remote from the container, but the cost of the device is increased.

Some attempts have been made to set the trigger levels at the factory, but the settings can be changed accidently during shipment or installation. Furthermore, since point level switches are often required to operate in high vibration applications, the potentiometers for setting trigger levels are vunerable to changed settings and damage.

Another contributor to the vibration problem is the power transformer for the geiger tube high voltage and signal circuit power supply. The weight of this transformer makes effective shockproof mounting of the electronics a problem.

SUMMARY OF THE INVENTION

The present invention concerns a digital point level switch which eliminates the need for an amplifier, the analog pulse rate to voltage converter, the potentiometers and the power transformer. Furthermore, the trigger level need not be adjusted and the resistance to shock and vibration is improved over the prior art devices. This switch utilizes the output pulses from the geiger tube and the frequency of the power line in a race circuit. The geiger tube output pulses are accumulated by a first or level counter to a first predetermined total representing a level of material in the container at which a below level condition is to be indicated. The power line cycles are accumulated by a second or interval counter to a second predetermined total representing a fixed length counting interval.

The race circuit is responsive to the counter which reaches its predetermined total first to reset both of the counters. If the first counter reaches the first predetermined total before the end of the counting interval, a control circuit is set for activating a low level alarm for adding material to the container. Then the race circuit becomes responsive to a third predetermined total of the first counter, less than the first predetermined total, representing a level of material in the container at which a high level condition is to be indicated. The first and third predetermined totals provide a hysteresis effect to prevent the point level switch from "hunting" around the level at which a high to low or a low to high transition is to take place.

After the container has been filled to the level represented by the third predetermined total, the race circuit will be controlled by the second counter. The second counter will reset the control circuit and turn off the low level alarm (or activate a high level alarm) and/or stop the filling of the container. Now the level in the container must drop from the level represented by the third predetermined total to the level represented by the first predetermined level before the above alarm condition is reversed.

It is an object of the present invention to provide a point level switch which is more economical to manufacture and install than prior art switches.

It is another object of the present invention to provide a point level switch which has increased resistance to shock and vibration.

It is a further object of the present invention to provide a point level switch which does not require field adjustments.

It is an object of the present invention to provide a point level switch which operates directly from a geiger tube and an a.c. power line.

It is a further object of the present invention to provide a point level switch which will more easily operate at lower radiation levels than prior art apparatuses.

DESCRIPTION OF THE PREFERRED EMBODIMENT

Figure 1:
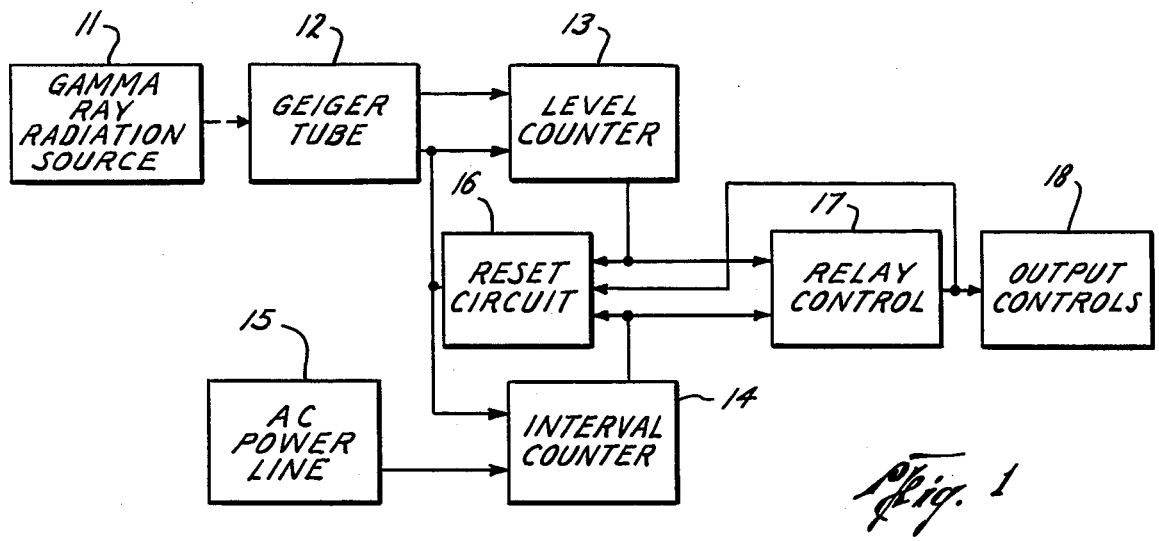
FIG. 1 is a block diagram of a point level switch according to the present invention.

FIG. 1 is a block diagram of the present invention, which can be utilized to control the level of a material in a container. A gamma ray radiation source 11 and a geiger tube 12 are positioned with respect to one another and the container (not shown) such that as the level of the material in the container rises above the indicator beam, less gamma rays are detected by the tube 12. Each detected gamma ray generates an output pulse from the geiger tube 12 to a first or level counter 13. The counter 13 is digital and generates an output signal when the predetermined number of geiger tube output pulses have been received. A second digital interval counter 14 receives input pulses from an a.c. power line 15 to define a counting interval.

Each counter has an output connected to a reset circuit 16. The level counter 13, upon reaching a first predetermined number of counts, and the interval counter 14, upon reaching a second predetermined number of counts, each generate an output signal to the reset circuit. If the interval counter reaches the second predetermined number of counts first, the reset circuit will respond to the output pulse to reset both counters and a new counting interval is begun. If the level counter reaches the first predetermined number of counts first, the counters will also be reset and an output flip flop which is responsive to the output signals from both counters, is set. The output relay 18 then provides a low level contact closure. As the material level in the container increases, there will be a level, the desired material level, where the interval counter will reach the second predetermined number of counts first and will generate an output pulse to reset both counters and the level control. Thus, the present invention will automatically turn on and off a relay for regulating the addition of material to a container in response to the level of such material in the container or for providing required high or low level alarms.

Figure 2:
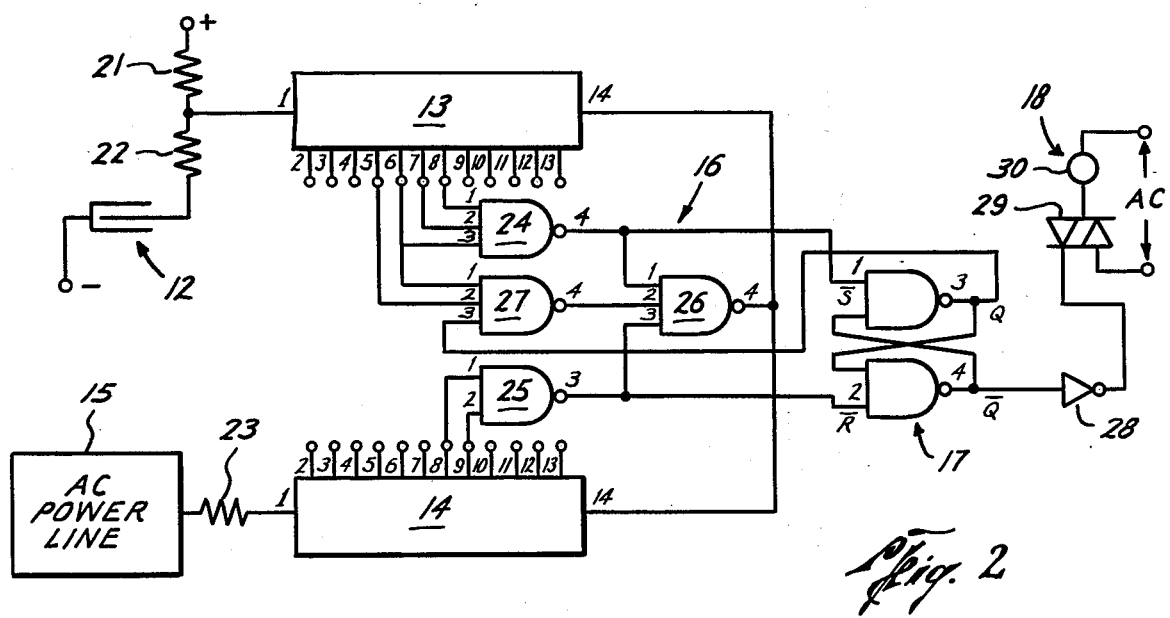
FIG. 2 is a schematic diagram of the point level switch of FIG. 1.

FIG. 2 is a schematic diagram of the present invention which is disclosed in block diagram form in FIG. 1. In the description of FIG. 2, a true or one logic signal will be represented as a "1" and a false or zero logic signal will be represented as a "0". Furthermore, each logic element having three or more terminals will have those terminals identified with a number and referenced by the element reference numeral, a dash and the terminal reference number, such as 13-1 for the input terminal of the level counter 13.

The geiger tube 12 has a cathode connected to a negative polarity d.c. power supply (not shown), typically minus 480 volts, and an anode connected through a pair of resistors 21 and 22 to a positive polarity d.c. power supply (not shown), typically fifteen volts. The junction of the resistors is connected to the counter input 13-1. The resistor 22 functions to limit current flow into the geiger tube 12 and resistor 21 functions as a load resistor to generate a logic level signal at the input 13-1. When a gamma ray is detected, a negative polarity pulse is generated on the anode of the geiger tube which in turn generates a negative going transition in the magnitude of the signal at the input 13-1.

The counter 13 may be a fourteen stage ripple-carry, binary counter/divider having the input 13-1, outputs 13-2 through 13-13 representing the first and fourth through fourteen binary stages and a reset input 13-14. A "1" to "0" change in signal at the input 13-1 is added to the total count in the counter 13 with the total count available in binary form at the outputs. A "1" at the reset input 13-14 will reset the counter and all its outputs to zero.

The interval counter 14 is similar to the level counter 13 and has an input 14-1 connected to the clock signal source 15 through a current limiting resistor 23. The source 15 can be an a.c. power source, typically the standard sixty hertz power line, wherein the transitions from positive to negative half cycles are counted by the counter 14. Thus, the total number of counts in the counter 14 represents elapsed time and the total number of counts in the counter 13 represents gamma rays during that time which total is modulated by material level when the material level is at or above the gamma ray beam.

The outputs 13-6, -7 and -8, representing the seventh, eighth and ninth stages of the counter 13, are connected to the inputs of a NAND gate 24. A NAND generates an "0" at its output when all of its inputs are at "1" and generates a "1" for any other combination of input signals. With its three inputs connected as shown, the NAND 24 will produce a "0" when the counter 13 has counted 448 pulses (256 + 128 + 64).

Outputs 14-8 and -9, representing the ninth and tenth stages of the counter 14, are connected to both inputs of a NAND 25 which will provide a "0" input when the timing counter 14 has counted 768 line cycles (512 + 256). An output 24-4 of the NAND 24 is connected to an input 26-1 of a NAND 26 and an output 25-3 of the NAND 25 is connected to an input 26-3 of the NAND 26. A NAND 27 has an output 27-4 connected to an input 26-2 and the NAND 26 has an output 26-4 connected to the reset inputs 13-14 and 14-14 of the first counter 13 and the second counter 14 respectively. The NAND's 26 and 27 are included in the reset circuit 16 of FIG. 1. If both counters have been reset, the NAND's 24, 25 and 27 will each generate a "1" such that the NAND 26 generates a "0" at the reset inputs to enable the counters to count.

The NAND 27 has a pair of inputs 27-1 and 27-2 connected to an output 13-5 and -6, representing the sixth and seventh stages of the counter 13, and an input 27-3 connected to an output 17-3 of a NAND (RS) flip flop representing the relay control 17 of FIG. 1. The output 24-4 of the NAND 24 is connected to the set input 17-1 of the flip flop and the output 25-3 is connected to the reset input 17-2. Another output 17-4 of the flip flop is connected to both inputs of a buffer. During each counting-time cycle outputs 24-4 and 25-3 are "1" allowing RS flip flop 17 to remain in whichever state it is already in. If the flip flop 17 is already in the "reset" state (17-4 = "1", 17-3 = "0") and the time counter 14 reaches its predetermined time of 768 (512 + 256) line cycles as shown in FIG. 2, the resulting "0" at 25-3 will cause both counters 13 and 14 to be reset, the count to be resumed, and the flip flop 17 will remain in the reset state. Should the flip flop 17 already be in the set state (17-4 = 0, 17-3 = 1), the "0" at 25-3 would change 17 to the reset state in addition to resetting both counters for a resumption of the count.

If the flip flop 17 is in the reset state while counter 13 reaches its high count preset of 448 (256 + 128 + 64) as defined by gate inputs 24-1, 24-2 and 24-3 as shown in FIG. 2, then the resulting "0" output in 24-4 switches the flip flop 17 to the set state causing a "1" at the output of buffer 28 to the relay driver 24. If the flip flop 17 is already set, input 27-3 will be "1". Thus, when counter 13 reads its low count preset of 96 (64 + 32), as defined by gate inputs 27-1 and 27-2, as shown in FIG. 2, both counters 13 and 14 will be reset and the count resumed without changing the state of flip flop 17.

A "1" at the sixth and seventh stage outputs 13-5 and -6 represents 96 (64 + 32) counts, a "1" at the eighth and ninth stage outputs 13-7 and -8 represents 448 (256 + 128 + 64) counts and at the ninth and tenth stage outputs 14-8 and -9 represents 768 (512 + 256) counts. If the counter 14 totals 768 counts before the counter 13 totals 448 counts, the NAND 25 will generate a "0" to the input 26-3. The NAND 26 responds by generating a "1" to reset both counters and start a new counting interval. The "0" generated by the NAND 25 is also applied to the reset input 17-2. This does not change the output signals generated by the flip flop 17 if the flip flop is already in the reset state. If it is in the set state, the flip flop 17 is switched to the reset state.

If, while the flip flop 17 is in the set state, the counter 13 totals 96 counts before the counter 14 totals 768 counts, the output 24-3 will change from "1" to "0" changing the NAND input 26-2 to be "0", and NAND output 26-4 to be "1", thus resetting both counters 13 and 14 and resetting a new counting interval. However, the flip flop 17 is in the reset mode, continuing to apply a "0" at the input 27-3 to generate the "1" to the NAND 26 such that the counters 13 and 14 continue to count. If the counter 13 totals 448 counts before the counter 14 totals 768 counts representing a lower than desired level of material in the container, the NAND 24-4 will change from "1" to "0" to the input 26-1. The NAND 26 responds by generating a "1" to reset both counters and start a new counting interval. The "0" generated by the NAND 24 is also applied to the set input 17-1. With the input 17-1 at "0" and the input 17-2 at "1", the output 17-3 will change to "1" and the output 17-4 will change to "0". The buffer 28 changes the signal at an output 28-2 from "0" to "1".

The output 28-2 is connected to a gate of a triac 29 connected in series with a relay coil 30 across an a.c. power source (not shown). When the signal at the output 28-2 switches from "0" to "1", the triac is turned on to pass a.c. current and energize the relay coil 30 providing a contact closure to indicate a low material level. Thus, as long as the flip flop 17 is in the set condition, the buffer 28 will generate a "1" and the material will flow into the container.

The "1" at the output 17-3 is applied to the input 27-3 to enable the NAND 27 to respond to "1"'s generated at the outputs 13-5 and -6. Such operation prevents the circuitry from "hunting" around the 448 count total as the count rate fluctuates and to the level of the material and radiation statistics. Thus, the container will be filled to a level just above that required to reduce the count rate below 96 counts during the counting interval. At the point, the counter 14 will total 768 counts before the counter 13 totals 96 counts and the NAND 25 will reset the flip flop 17 with a "0" at the input 17-2. The output 17-4 will change to "1" to turn off the triac 29 and stop the filling of the container. The output 17-3 will change to "0" to disable the NAND 27 and the "0" from the NAND 25 will generate a "1" from the NAND 26 to reset both of the counters. Now the counters will continue to be reset by the 768 count total of the counter 14 until the material falls to the level where the counter 13 totals 448 counts before the counter 14 totals 768 counts. Then the filling operation will be started. Thus, the circuit of FIG. 2 has been disclosed as having a seventy-five percent hysteresis, 96 to 448 counts, but any combination of the outputs of the level counter 13 could be utilized to obtain the desired hysteresis and total counts. Also, any combination of outputs from counter 14 could be utilized to different time intervals.

Although the relay coil 30 has been discussed in terms of operating an apparatus for adding material to the container, it could be utilized to actuate an alarm to indicate a high or low level. Furthermore, the BUFFER 28 could have its inputs connected to the output 17-3 instead of the output 17-4 if it is desired to have the relay energized for low material level instead of high material level.

Figure 3:
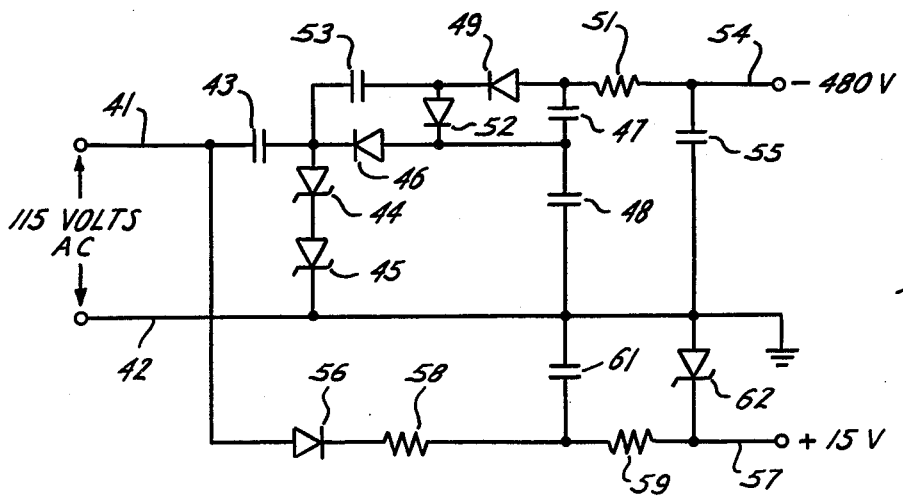
FIG. 3 is a schematic diagram of the power supply for the geiger tube of FIGS. 1 and 2.

In FIG. 3 there is show a schematic diagram of the regulated voltage multiplier power supply for the geiger tube 12. This power supply eliminates the power transformer of the prior art power supplies. A pair of input lines 41 and 42 are connected to a 115 volt a.c. power supply (not shown) which is commonly available in manufacturing operations. The line 41 is connected through a coupling capacitor 43 to an anode of a zener diode 44 which has the cathode connected to the anode of another zener diode 45. The zener diode 45 has the cathode connected to the input line 42. The zeners are each rated at 120 volts to provide a half wave rectified wave form clipped at 240 volts to approximate a square wave.

A diode 46 has the cathode connected to the anode of the zener diode 44 and the anode connected to the junction of a pair of capacitors 47 and 48. The other side of the capacitor 48 is connected to the input line 42 and the other side of the capacitor 47 is connected to the junction of the anode of a diode 49 and a filter resistor 51. The cathode of the diode 49 is connected to the anode of a diode 52 having the cathode connected to the anode of the diode 46. A capacitor 53 is connected from the cathode of diode 46 to the anode of diode 52. The other end of the resistor 51 is connected to the negative 480 volt output line 54 and a capacitor 55 is connected between the lines 42 and 54.

When the input line 41 is negative with respect to the input line 42, the capacitor 48 will charge to 240 volts through the diode 46 and the coupling capacitor 43 as the zener diodes 44 and 45 clip the applied a.c. wave form. Thus, the junction of the capacitors 47 and 48 is at a negative 240 volts with respect to the line 42. When the line 41 is positive with respect to the line 42, the zener diodes will hold the junction of the capacitors 43 and 53 near the potential on the line 42 and the capacitor 53 will charge to a negative 240 volts through the diode 52. When the line 41 is again negative with respect to the line 42, the capacitor 53 is clamped at a negative 240 volts by the zener diodes 44 and 45 and, therefore, the junction of the diodes 49 and 52 will be 240 volts below the potential at the junction of the capacitors 43 and 53 or a negative 480 volts. The capacitor 47 will now charge to 240 volts, a negative 240 volts at the junction of the capacitors 47 and 48 and a negative 480 volts at the junction of the diode 49 and the resistor 51. Thus, the capacitors 47 and 48 provide 480 volts to charge the output capacitor 55 and generate a negative 480 volt potential on the output line 54 with respect to the input line 42.

A diode 56 has an anode connected to the input line 41 and a cathode connected to a positive fifteen volt output line 57 through a pair of series connected current limiting resistors 58 and 59. A filter capacitor 61 is connected between the junction of the resistors 58 and 59 and the input line 42. A fifteen volt zener diode has an anode connected to the input line 42 and a cathode connected to the output line 57. When the line 41 is positive with respect to the line 42, the capacitor charges through the resistor 58 and the zener diode clips the wave form at fifteen volts. Thus, this portion of the power suply is a half wave rectifier wherein the resistors 58 and 59 function as a voltage divider to permit the use of a lower voltage filter capacitor 61.

If the geiger tube 12 of FIG. 2 is connected across the output lines 54 and 57, 495 volts d.c. are applied to the tube to render it operational. The capacitors 55 and 61 smooth the output and provide current during the negative half cycle of the a.c. input voltage. The output line 57 and the input line 42 can also be connected to the logic elements of FIG. 2 to provide operating power thereto.

The accuracy of the level detection depends upon the strength of the radiation, the number of gamma rays emitted over a time interval, and the length of the counting time interval. Since it is important from a cost standpoint to operate at the minimum possible radiation levels, it is necessary to utilize relatively long counting time intervals such as one or two minutes. In an analog device, the circuitry required to obtain the required time constants becomes too costly and unreliable. The present invention can utilize relatively short counting time intervals, the output 14-8 represents 4.27 seconds at sixty hertz, or relatively long counting time intervals, the output 14-13 represents 137 seconds at sixty hertz. Thus, in operations where the rate of change in level the material does not require rapid response, the present invention can function at as much as a factor of ten lower ratiation source strength than the conventional analog point level switch. Furthermore, the counters 13 and 14 can each have any two or more of their outputs connected to a NAND having the required number of inputs to obtain any desired count total between one and the maximum 16,384.

In summary, the present invention is preferably utilized in a system of detecting the level of material in a container and activating an alarm or adding material when the material has reached a first predetermined level at which material is to be added. A radiation source, such as a gamma ray source, and a detector means, such as a geiger tube, generate a pulsed output signal at an average pulse rate that is inversely proportional to the level of the material in the container. A first counter means is responsive to the pulsed output signal for accumulating a pulse count and generating an output signal for a first predetermined total number of pulses counted representing the first predetermined level. A second counter means is responsive to clock pulses, such as the cycles of an a.c. signal, for accumulating a pulse count and generating an output signal for a second predetermined total number of pulses counted representing a counting time interval. A resetting means is responsive to the first and second predetermined total output signals for resetting the first and second counter means and means are responsive to the first predetermined total output signal for generating a signal indicating that the material has reached the first predetermined level.

The first counter means also generates an output signal for a third predetermined total number of pulses counted representing a second predetermined level of the material. The resetting means is responsive to the third predetermined total output signal during the time the indicating signal is being generated. The indicating means is responsive to the second predetermined total output signal for terminating the generation of the indicating signal for indicating that the material has reached the second predetermined level. The indicating means can be a control means for generating a control signal for activating an alarm or means for adding material to the container. The indicating or control means can include a flip flop means which is set by the first predetermined total output signal to generate the control signal and an enable signal and is reset by the second predetermined total output signal to terminate the generation of the control signal and the enable signal. The resetting means can be responsive to the enable signal and the third predetermined total output signal for resetting the first and second counter means.

The present invention also concerns a method for determining the level of material in a container comprising the steps of generating detection pulses at an average rate inversely proportional to the level of the material in the container, generating clock pulses at a predetermined rate, simultaneously accumulating said detection pulses in a first counter means and said clock pulses in a second counter means, generating an output signal from the first counter means for a first predetermined total number of pulses counted representing a first predetermined level of the material, generating an output signal from the second counter means for a second predetermined number of pulses counted representing a counting time interval, resetting the first and second counting means in response to the one of the first and second predetermined total output signals which is generated first, and generating a signal in response to the first predetermined total output signal to indicate that the material has reached the first predetermined level. The method can also include the steps of generating an output signal from the first counter means for a third predetermined total number of pulses counted representing a second predetermined level of the material and resetting the first and second counting means in response to the generation of the third predetermined total output signal after the first predetermined total output signal has been generated. The method further can include the step of terminating the generation of the signal representing the first predetermined level in response to the generation of the second predetermined total output signal to indicate that the material has reached the second predetermined level.

In accordance with the provisions of the patent statutes, the principle and mode of operation of the invention have been explained and illustrated in its preferred embodiment. However, it must be understood that the invention may be practiced otherwise than as specifically illustrated and described without departing from its spirit or scope.

What is claimed is:

1. In a system for detecting the level of material in a container, including a source of radiation, the transmission of the radiation being attenuated by the material; detector means responsive to the radiation for generating a pulsed output signal, the radiation source and the detector means being positioned with respect to each other and the container such that the average pulse rate of the detector means output signal is reduced by increase in the level of the material in the container above a predetermined level; and control means responsive to the detector means pulsed output signal for indicating when the material has reached a first predetermined level, the control means comprising:

a first counter means responsive to the pulsed output signal for accumulating a pulse count and generating an output signal for a first predetermined total number of pulses counted representing the first predetermined material level when said total is reached within a given time;

a source of clock pulses generated at a predetermined constant rate;

a second counter means responsive to said clock pulses for accumulating a pulse count and generating an output signal for a second predetermined total number of pulses counted representing a given time interval;

means responsive to said first and second predetermined total output signals for resetting said first and second counter means; and means responsive to said first predetermined total output signal for generating a material low signal indicating that the material is below the first predetermined level.

2. A control means according to claim 1 wherein said first counter means generates an output signal for a third predetermined total number of pulses counted representing a second predetermined level of the material when said total is not reached until said given time; said resetting means is responsive to said third predetermined total output signal during the time said material low indicating signal is being generated; and said indicating means is responsive to said second predetermined total output signal for terminating the generation of said material low indicating signal for indicating that the material has reached the second predetermined level.

3. In a system for maintaining the level of material in a container including a source of gamma ray radiation, the transmission of the radiation being attenuated by the material; a geiger tube for generating output pulses in response to the detection of the gamma rays, the gamma ray source and the geiger tube being positioned with respect to each other and the container such that the average output pulse rate of the geiger tube is inversely proportional to the level of the material in the container; and means for adding material to the container in response to a control signal, a control means comprising:

a first counter means responsive to the output pulses for accumulating a pulse count and generating an output signal for a first predetermined total number of pulses counted representing a first predetermined material level at which material is to be added to the container;

a source of an a.c. signal;

a second counter means responsive to said a.c. signal for accumulating a count of the a.c. signal cycles and generating an output signal for a second predetermined number of cycles counted representing a counting time interval;

means responsive to said first and second predetermined total output signals for resetting said first and second counter means; and means responsive to said first predetermined total output signal for generating said control signal whereby the material is added to the container.

4. A control means according to claim 3 wherein said first counter means generates an output signal for a third predetermined total number of pulses counted representing a second predetermined material level at which the addition of material to the container is to be terminated, said resetting means is responsive to said third predetermined total output signal during the time period said control signal means is generating said control signal for resetting said first and second counter means, and said control signal means is responsive to said second predetermined total output signal to terminate the generation of said control signal whereby the addition of material to the container is stopped.

5. A control means according to claim 4 wherein said control signal means includes a flip flop means, said flip flop means being set by said first predetermined total output signal to generate said control signal and being reset by said second predetermined total output signal to stop the generation of said control signal.

6. A control means according to claim 5 wherein said flip flop means is set by said first predetermined total output signal to generate an enable signal and is reset by said second predetermined total output signal to terminate the generation of said enable signal and wherein said resetting means is responsive to said enable signal and said third predetermined total signal for resetting said first and second counter means.

7. A method for determining the level of material in a container comprising the steps of:

a. generating detection pulses of an average rate which decreases as material level increases above a given level in said container;

b. generating clock pulses at a predetermined constant rate;

c. simultaneously accumulating said detection pulses in a first counter means and said clock pulses in a second counter means;

d. generating an output signal for said first counter means for a first predetermined total number of pulses counted representing a first predetermined level of the material;

e. generating an output signal from said second counter means for a second predetermined total number of pulses counted representing a counting time interval;

f. resetting said first and second counting means in response to the one of said first and second predetermined total output signals which is generated first; and g. generating a material low signal in response to said first predetermined total output signal to indicate that the material has reached said first predetermined level.

8. A method according to claim 7 including the steps of generating an output signal from said first counter means for a third predetermined total number of pulses counted representing a second predetermined level of the material and resetting said first and second counting means in response to the generation of said third predetermined total output signal after said first predetermined total output signal has been generated.

9. A method according to claim 8 including the step of terminating the generation of said signal representing said first predetermined level in response to the generation of said second predetermined total output signal to indicate that the material has reached said second predetermined level.

10. A method according to claim 7 including the step of activating an alarm in response to the generation of said indication signal.

11. A method according to claim 7 including the step of adding material to the container in response to the generation of said indication signal.

12. In a system for detecting the level of material in a container, including a source of radiation, the transmission of radiation being attenuated by the material; detector means responsive to the radiation for generating a pulsed output signal, the radiation source and the detector means being positioned on one of the same or adjacent sides of a vessel such that detected radiation increases with increasing material level in response to scattered radiation and the average pulse rate of the detector means output signal is increased by an increase in the level of the material in the container above a predetermined level; and control means responsive to the detector means pulsed output signal for indicating when the material has reached a first predetermined level, the control means comprising:
- a first counter means responsive to the pulsed output signal for accumulating a pulse count and generating an output signal for a first predetermined total number of pulses counted representing the first predetermined material level when said total is reached within a given time;
- a source of clock pulses generated at a predetermined constant rate;
- a second counter means responsive to said clock pulses for accumulating a pulse count and generating an output signal for a second predetermined total number of pulses counted representing a given time interval;
- means responsive to said first and second predetermined total output signals for resetting said first and second counter means; and
- means responsive to said first predetermined total output signal for generating a material high signal indicating that the material is above the first predetermined level.

13. A control means according to claim 12 wherein said first counter means generates an output signal for a third predetermined total number of pulses counted representing a second predetermined level of the material when said total is not reached within said given time; said resetting means is responsive to said third predetermined total output signal during the time said material high indicating signal is being generated; and said indicating means is responsive to said second predetermined total output signal for terminating the generation of said material high indicating signal for indicating that the material has reached the second predetermined level.

14. The control means of claim 1 wherein said first counter means generates an output signal for a fourth predetermined total number of pulses counted representing radiation level equal to background radiation when said total is reached within said given time interval and said second counter means is operably associated with a malfunction-indicating means such that a malfunction indication signal is generated whenever said second predetermined given time interval is reched before said fourth predetermined pulse count is reached.

15. The control means of claim 12 wherein said first counter means generates an output signal for a fourth predetermined total number of pulses counted representing radiation level equal to background radiation when said total is reached within said given time interval and said second counter means is operably associated with a malfunction-indicating means such that a malfunction indication signal is generated whenever said second predetermined given time interval is reached before said fourth predetermined pulse count is reached.

16. In a system for maintaining the level of material in a container including a source of gamma ray radiation, the transmission of the radiation being attenuated by the material; a geiger tube for generating output pulses in response to the detection of the gamma rays, the gamma ray source and the geiger tube being positioned with respect to each other and the container such that the average output pulse rate of the geiger tube is inversely proportional to the level of the material in the container; and means for adding material to the container in response to a control signal, a control means comprising:
- a first counter means responsive to the output pulses for accumulating a pulse count and generating an output signal for a first predetermined total number of pulses counted representing a first predetermined material level at which material is to be added to the container;
- a source of a A.C. signal;
- a second counter means responsive to said A.C. signal for accumulating a count of the A.C. signal cycles and generating an output signal for a second predetermined number of cycles counted representing a counting time interval;
- means responsive to said first and second predetermined total output signals for resetting said first and second counter means; and
- means responsive to said first predetermined total output signal for generating said control signal whereby the material is added to the container.

17. The control means of claim 16 wherein said first counter means generates an output signal for a fourth predetermined number of pulses counted representing radiation level equal to background radiation when said total is reached within a given time, and said second counter is operably associated with a malfunction-indicating means such that a malfunction indication signal is provided whenever said second predetermined given time is reached before said fourth predetermined pulse count is reached.

18. The control means of claim 16 wherein the average d.c. current through said detector means is monitored by a sensing means, said sensing means stopping the input of pulses to said first counter means whenever said d.c. current exceeds a predetermined level, such that said malfunction signal is activated upon failure of achievement of said fourth count within said predetermined given time.

* * * * *